Figure 1:
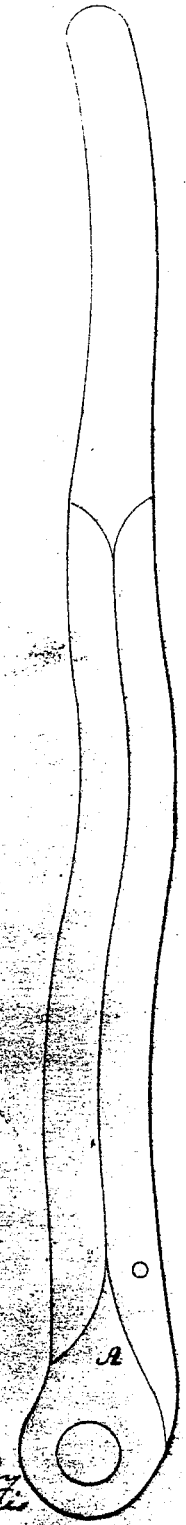
Figure 1:
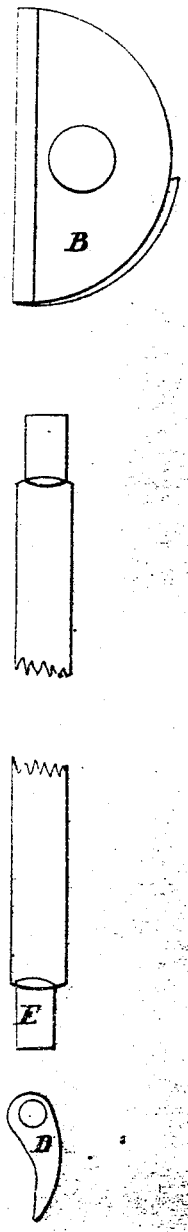
Figure 2:
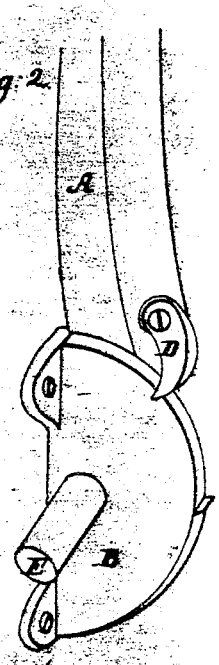

112

EXA

BEST AVAILABLE COPY

A. Quigley.

Carriage Top.

No. 150. A. I. Patented Aug. 26, 1850.

Witnesses:

Anthony Quigley

Jerry L. Wadie

Inventor,

Aaron Quigley

[redacted]